United States Patent [19]

Nix

[11] 4,246,451
[45] Jan. 20, 1981

[54] SECURITY MOUNTING SYSTEM FOR COIN TELEPHONE

[75] Inventor: Walter E. Nix, Gainesville, Ga.

[73] Assignee: Gladwin, Inc., Oakwood, Ga.

[21] Appl. No.: 30,909

[22] Filed: Apr. 17, 1979

[51] Int. Cl.³ .............................................. H04M 1/04
[52] U.S. Cl. ................................................. 179/146 R
[58] Field of Search ................. 179/146 R, 178, 179, 179/189 R, 147, 148 R, 151

[56] References Cited

U.S. PATENT DOCUMENTS

| | | | |
|---|---|---|---|
| 1,844,557 | 2/1932 | Bobrick . | |
| 3,213,210 | 10/1965 | Samples | 179/189 |
| 3,398,244 | 8/1968 | Ertl et al. | 179/189 |
| 3,471,656 | 10/1969 | Quigley | 179/146 R |
| 3,511,941 | 5/1970 | Quigley | 179/146 R |
| 3,752,927 | 8/1973 | Bartley et al. | 179/146 R |
| 3,851,119 | 11/1974 | Tucker | 179/146 R |
| 3,868,483 | 2/1975 | Trimmer et al. | 179/146 R |
| 3,946,977 | 3/1976 | Kuhfus | 179/146 R |

*Primary Examiner*—Thomas A. Robinson
*Attorney, Agent, or Firm*—James L. Bean

[57] ABSTRACT

A mounting stud latching system is provided for a coin telephone mounting post having spaced front and back walls and an intermediate mounting wall, with an opening in the front wall dimensioned to receive and closely surround the side walls of a coin telephone housing. Mounting studs on the back of the telephone housing project through openings in the mounting wall and are engaged and retained by keyhole-shaped openings in a latching plate slideably mounted on the back surface of the mounting wall. A plurality of threaded fasteners are inserted through openings in the back wall of the telephone housing to engage threaded openings in the mounting wall to firmly mount the telephone. Improved means are provided for permanently mounting the sliding latch plate on the back surface of the mounting wall.

10 Claims, 8 Drawing Figures

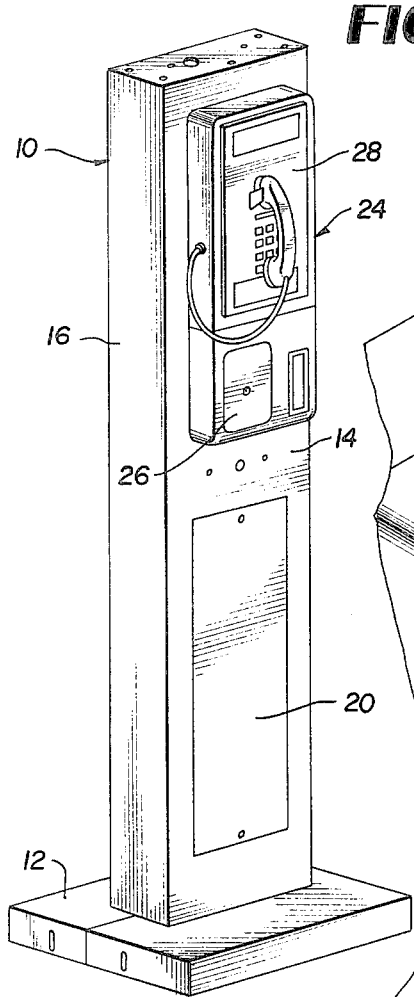
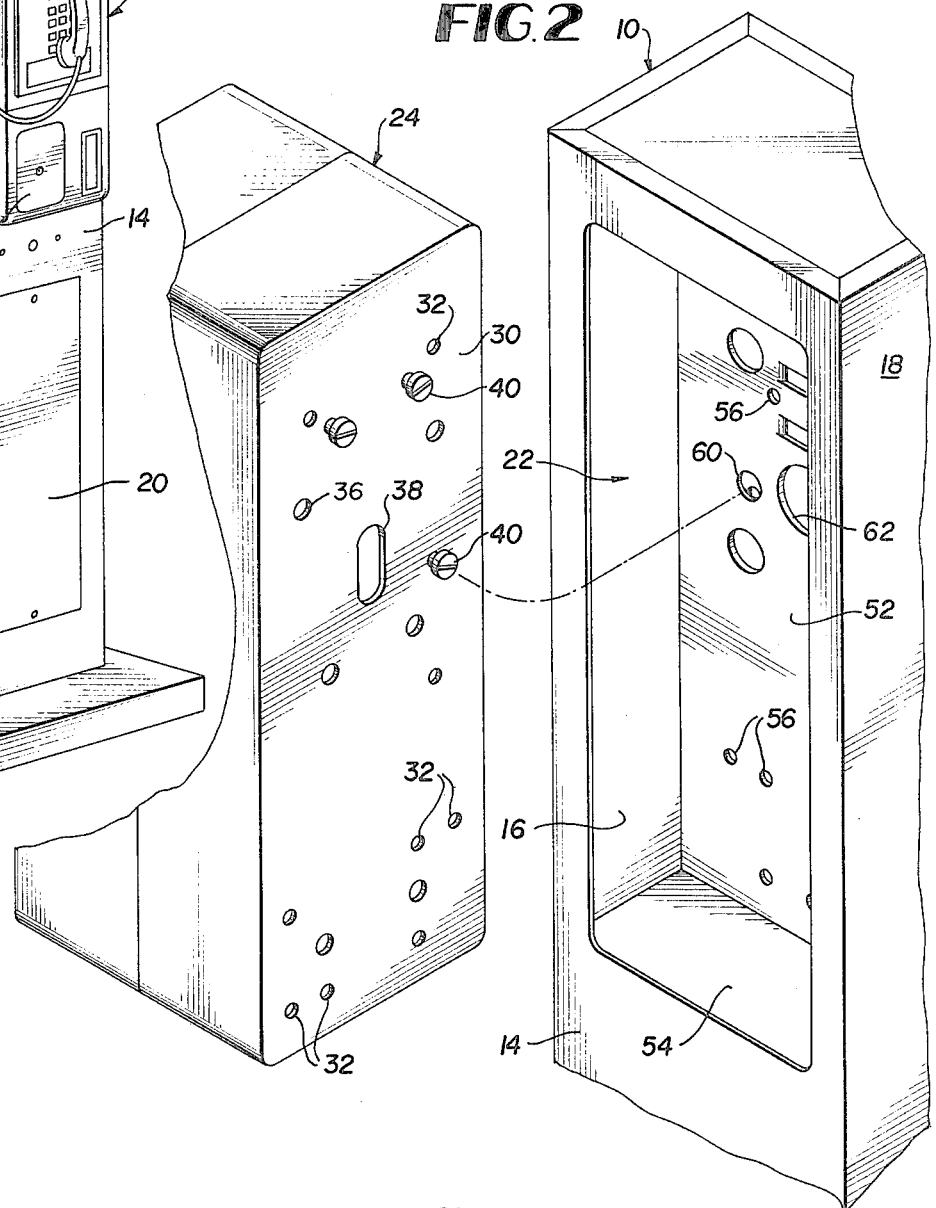
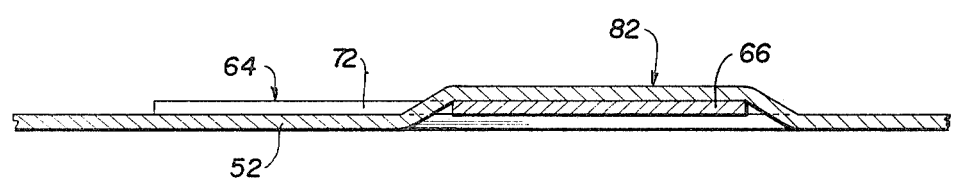
FIG. 1
FIG. 2
FIG. 5

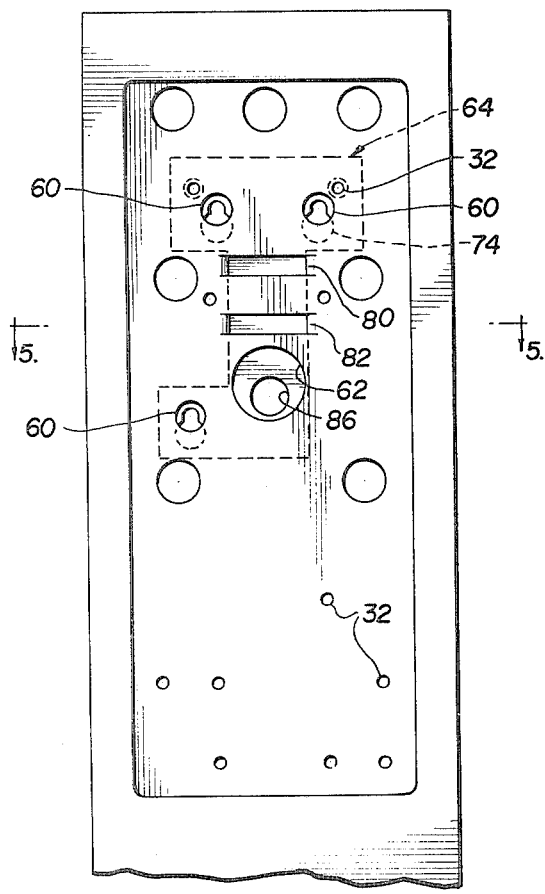
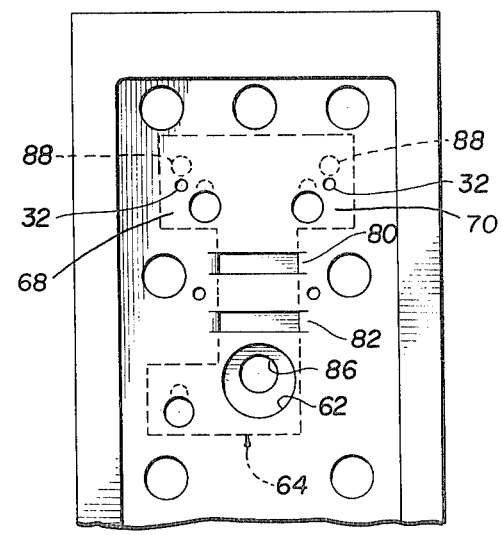
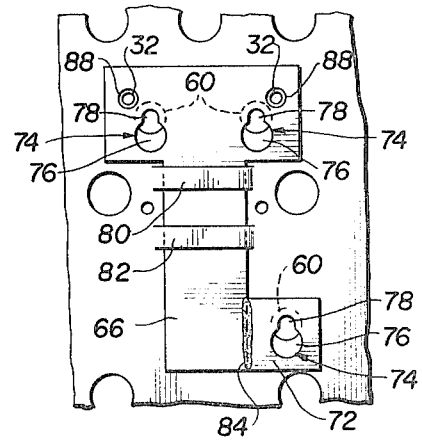
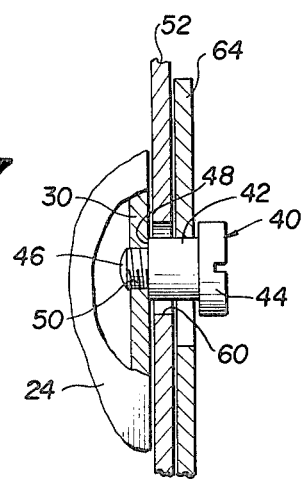
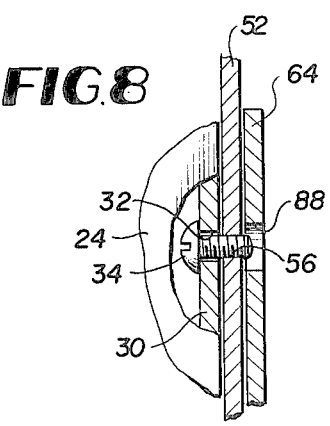

SECURITY MOUNTING SYSTEM FOR COIN TELEPHONE

BACKGROUND OF THE INVENTION

1. Field of the Invention

This invention relates to coin telephone mounting, and more particularly to improved means for mounting a coin telephone in a recessed opening dimensioned to closely embrace the side walls of the coin telephone housing.

2. Description of the Prior Art

Vandalism to public or coin telephones has long been a serious problem to the industry and the substantial increase in the incidence of such vandalism in recent years has resulted in a corresponding increase in efforts to design more secure coin telephones and coin telephone mounting systems. One important development in coin telephone security mounting involves recessing the telephone housing in an opening which closely embraces the side walls of the housing, making it impossible to pry the telephone from the mounting with the prying tool inserted behind the housing by denying access to the juncture of the mounting plate and housing. Such a telephone mounting is illustrated, for example, in U.S. Pat. No. 3,752,927.

It is conventional practice to secure a public telephone to a mounting plate by use of a plurality of headed screw fasteners extending through spaced openings in the back wall of the telephone housing and engaging correspondingly spaced threaded openings in the mounting plate. Once the telephone instrument and coin box are installed, the heads of the fasteners located within the housing are inaccessible except by use of a key.

Aligning the plurality of openings in the back wall of the telephone housing with the corresponding threaded openings in a vertical mounting plate, and holding the telephone in alignment while installing the threaded fasteners presents problems for the installer, and a number of aligning and support pins have been employed on the back wall of the telephone housing in position to engage guide openings in the mounting plate to accurately align the two elements and to partially support the telephone housing during installation of the mounting screws. An additional security feature has been obtained by substituting strong, headed studs for the aligning pins, with the head on the studs being dimensioned to pass through the larger diameter portion of generally keyhole-shaped aligning openings, and the body or shank of the studs being dimensioned to closely engage the smaller diameter section of the keyhole-shaped openings. Thus, by placing the back wall of the telephone housing in surface-to-surface contact with the mounting plate, and with the security studs projecting through the keyhole-shaped openings, the telephone housing is then slid vertically downward along the mounting plate to engage the small diameter portion of the keyhole-shaped opening with the stud shank and to engage the stud head with the back surface of the mounting plate. The studs then firmly hold the housing during installation of the threaded fasteners, with the fasteners and studs cooperating to interlock the mounting plate and housing. Thus, the mounting studs may provide an additional element of security against forceable removal of the instrument from the mounting plate, and such studs are now generally referred to as security studs.

Coin telephones installed in recessed openings in a rigid mounting structure such as the security post shown in U.S. Pat. No. 3,752,927, mentioned above, do not require the aligning pins or headed mounting studs since relative movement between the internal mounting wall and telephone housing is prevented by the close fit between the periphery of the opening and the adjacent housing walls. This close fit serves to accurately align the telephone instrument and mounting wall so that the screw fasteners can readily be installed by a single person, the only requirement being that the installer manually hold the instrument housing within the opening until at least one mounting screw is installed.

U.S. Pat. No. 3,398,244 discloses a coin telephone mounting system in which the telephone instrument is mounted in a rectangular metal box-like structure which is intended to be attached to a wall or recessed into an opening in a wall. The mounting system employs a slideable latching plate mounted for limited movement within a chamber in the box-like structure for securing the telephone instrument to a mounting wall spaced from the rear wall of the box. The sliding plate includes keyhole-shaped openings for engaging the security studs, and threaded openings for receiving the threaded fasteners which pass through the mounting plate to clamp the mounting plate between the instrument housing and sliding plate. The telephone instrument is hinged to the metal box and may be swung open independently of movement of the locked coin box beneath the telephone instrument, and at least a portion of the mounting screws threaded into the sliding plate are located behind the locked coin box for increased security. The clamping force exerted on the mounting plate by the mounting screws prevent vertical movement of the instrument and the sliding plate.

SUMMARY OF THE INVENTION

In accordance with the present invention, an improved, simple and relatively inexpensive means is provided for utilizing the conventional security studs to facilitate mounting a coin telephone in a recessed opening in a rigid, hollow support structure or post, with the instrument being mounted directly onto a rigid internal mounting wall within the support structure. To this end, an internal wall of the type disclosed, for example, in the above-mentioned U.S. Pat. No. 3,752,927, is provided with integral mounting straps cut or die-formed from the body of the internal wall and extending in outwardly spaced relation to its back surface to support a security stud latching plate for limited sliding movement along the back surface of the internal wall. The internal wall is provided with a plurality of threaded openings for threadably engaging screw fasteners passing through openings in the back wall of the coin telephone housing, and with a plurality of enlarged openings for permitting the heads of the usual security studs to pass therethrough unobstructed.

An enlarged opening is provided in the internal wall in alignment with a similar opening in the back wall of the telephone housing to permit the necessary wiring to pass from the interior of the post through the internal wall directly into the telephone housing. A smaller opening formed in the sliding latch plate is located to permit a person installing the telephone to insert a finger or tool through the cable openings to engage the smaller opening to move the sliding plate between a raised and lowered position. The latch plate is provided with keyhole-shaped openings having an enlarged bottom portion dimensioned to permit the heads of the security studs to pass therethrough when the sliding plate is in the raised position and a reduced top portion dimensioned to closely engage the shank of the security studs when in the lowered position. Thus, a simple, easy to manufacture means is provided for facilitating the installation of a coin telephone in such a security post, utilizing the conventional security studs to retain the instrument in the opening during installation, and to provide additional security against removal of the instrument by force after installation. Since the telephone housing is located by the dimensions of the recessed opening, and since the housing is secured in the opening by screw fasteners threadably engaging openings in the internal wall, extreme accuracy is not required in dimensioning the sliding plate or in locating the plate on the internal wall.

BRIEF DESCRIPTION OF THE DRAWINGS

Other features and advantages of the present invention will become apparent from the detailed description thereof contained hereinbelow, taken in conjunction with the drawings, in which:

FIG. 1 is a perspective view of a coin telephone mounted within a recessed opening in a security mounting post, utilizing the mounting system of the present invention;

FIG. 2 is an enlarged, fragmentary view, in perspective, schematically illustrating the installation of the coin telephone housing in the security post of FIG. 1;

FIG. 3 is a fragmentary front elevation view of a coin telephone security mounting post embodying the present invention;

FIG. 4 is a view similar to FIG. 3, with certain elements illustrated in an alternate position;

FIG. 5 is a fragmentary sectional view taken along line 5—5 of FIG. 3;

FIG. 6 is a view of a portion of the structure shown in FIG. 3 and taken from the back thereof;

FIG. 7 is a fragmentary sectional view illustrating a portion of the mounting system employed to mount the telephone in FIG. 1; and FIG. 8 is a view similar to FIG. 7 and showing another part of the mounting system.

DESCRIPTION OF THE PREFERRED EMBODIMENTS

Referring now to the drawings in detail, a telephone mounting system in accordance with the present invention is illustrated as being incorporated in a generally rectangular tubular steel support post designated generally by the reference numeral 10 and supported on a base 12. Post 10 comprises a generally vertical, substantially flat front wall 14, opposed side walls 16, 18, and a back wall, not shown. Front wall 14 has a service access opening in its lower portion which is normally closed by lock panel 20, and a generally rectangular opening 22 in its upper portion. Rectangular opening 22 is shaped and dimensioned to closely conform to the external peripheral edge surfaces of the housing 24 of a public telephone of the type including a locked coin receiving section 26 in its lower portion and a telephone instrument, indicated generally at 28, in its upper section.

The coin telephone housing 24 is of standard construction and includes a substantially flat back wall panel 30 which has a plurality of openings 32 formed therein in a standard hole pattern employed to mount the housing 24 to a mounting plate, using headed screw fasteners 34 (FIG. 8) which pass through the openings 32 from within the housing 24. A second pattern of openings 36, which are somewhat larger than the openings 32, are also provided in the standard coin telephone housing for use in mounting the housing by larger fasteners, not shown. A large vertically elongated opening 38 is formed in the back wall panel to permit a telephone cable or the like to be drawn into the housing 24.

A plurality of high strength security studs 40 are also mounted on and project rearwardly from back wall panel 30. As best seen in FIG. 7, each security stud 40 has a substantially cylindrical body or shank portion 42 with an enlarged, slotted head 44 on its rearwardly projecting end and a short, threaded extension on its forwardly facing end. Threaded extension 46 is of substantially smaller diameter than shank portion 42, providing an annular shoulder portion 48 on the forwardly facing end of shank 42 for engaging the surface of the back wall panel 30 when the security stud is turned into a threaded opening 50 in the back panel 30 to accurately position the head 44 relatively to the wall panel 30. In the embodiment illustrated in the drawings, three such security studs 40 are provided.

Mounting post 10 is provided with a vertical internal wall 52 extending in generally parallel, rearwardly spaced relation to front wall 14 and forward of the back wall of the post with internal wall 52 extending downward at least to the extent of the bottom of opening 22. Wall 52 is rigidly supported within the post, as by welding to the inner surfaces of side walls 16, 18, and a support plate 54 extends from the front wall 14, at the bottom of opening 22, to the forwardly directed surface of internal wall 52.

A plurality of threaded holes 56 are formed in wall 52, with holes 56 being arranged in a pattern corresponding to the pattern of openings 32 in the back wall panel 30 of housing 24. Similarly, a group of stud receiving openings 60, each having a diameter slightly larger than the diameter of the heads 44 of studs 40 are formed in wall 52 in position to permit the stud heads to pass through and to project rearwardly from the back surface of wall 52. Thus, when housing 24 is positioned within opening 22 and with the back wall panel 30 flush against the forward surface of inner wall 52, fastener openings 32 are axially aligned with threaded openings 56. A large cable opening is formed in internal wall 52 immediately behind elongated opening 38 in rear wall panel 30, when housing 24 is installed in the post.

As best seen in FIGS. 3–7, a flat latch plate 64 is mounted for limited vertical and sliding movement on the back surface of internal wall 52. Latch plate 64 has a complex shape which can be described as consisting of a substantially rectangular, vertically extending central body portion or web 66 with a pair of generally rectangular flange portions 68, 70 projecting laterally from its top edges, one on each side thereof, with the web and flanges cooperating to define a substantially T-shaped section. A third flange 72 projects laterally from one side edge of the central web 66 at one bottom edge thereof. As described below, flange 72 may be separately formed and welded to the web section 66 after mounting on the back surface in the wall 52.

As best seen in FIG. 6, latch plate 64 has three generally keyhole-shaped openings 74 formed therein, one in each of the flanges 68, 70 and 72. Keyhole-shaped openings 74 each have an enlarged lower portion 76 of a diameter to permit the head 44 of studs 40 to pass therethrough, and a more narrow upper portion 78 corresponding substantially in size to the shank 42 of stud 40.

Latch plate 64 is permanently mounted on the back surface of inner wall 52 by a pair of relatively narrow, vertically spaced straps 80, 82 integrally formed from the material of wall 52 in an area back of the upper portion of the hole 22 in front wall 14. Straps 80, 82 may be formed by a lancing operation in which two parallel slits or shear lines are formed one along each side edge of the respective straps, with the material of the strap being deformed by a pressing operation to offset the central body portion of the strap from the back surface of the inner wall 52 by an amount slightly greater than the latch plate 64. Latch plate 64, when inserted in front of the straps 80, 82, is then free to slide vertically along the back surface of wall 52, within limits as described below. The end portions of the straps 80, 82 are shaped to limit lateral movement of the latch plate 64, as can be seen from FIG. 5.

It is apparent that, when lanced straps 80, 82 are employed to retain latch plate 64, the complete latch plate assembly cannot be inserted behind the straps. Accordingly, the latch plate can be initially formed as a substantially T-shaped section, omitting the lower flange 72, until the more narrow web or body portion 66 is inserted behind the lanced straps. Preformed flange 72 can then be welded, as illustrated at 84 in FIG. 6, to the side edge of web 66. The flanges 68, 70 and 72 act as stops, engaging straps 80, 82 to limit the vertical sliding movement of the latch plate 64 and positively retain it against withdrawal.

The keyhole-shaped openings 74 are arranged on latch plate 64 in a pattern corresponding to the pattern of openings 60 in inner wall 52 which, of course, corresponds to the arrangement of the studs 40 on back wall panel 30. A cable hole 86 having a diameter substantially less than the diameter of hole 62 is provided in latch plate 64 in alignment with the lower portion of hole 62 when the latch plate is in its lowered position. Upper strap 80 is positioned to engage the bottom edge of flanges 68, 70 to limit downward movement of the latch plate to a position in which the hole 86 is readily accessible through aligned holes 38 and 62.

The diameters of holes 38 and 62 are such that an installer can easily insert a finger or a suitable tool into cable hole 86 to lift the latch plate to a raised position, shown in FIG. 4, in which the larger bottom portion 76 of the keyhole-shaped openings are in alignment with the stud receiving openings 60. In this position, telephone instrument housing 24 can be easily pushed backward to pass the enlarged heads 44 of the studs 40 through the large bottom portion of the keyhole-shaped openings. The installer can then release the latchplate and permit it to fall, by gravity, to the position shown in FIGS. 3 and 7 in which the small, upper portions of the keyhole shaped openings engage the stud shanks 42 and releasably retain the instrument against removal.

For clarity of illustration, substantial space is shown in FIG. 7 between the back wall panel 30, the internal wall 52, the latch plate 64 and the stud head 44; however, in practice, these elements would be substantially in surface-to-surface contact with only enough clearance provided to permit free movement of the latch plate 64 between its raised and lowered positions.

The latch plate 64 is relatively small in comparision to the size of the back wall panel of the telephone housing, and is located behind the upper portion of the telephone housing. Preferably, the latch plate has at least the major portion of its area above the horizontal centerline of the opening 22, and is shaped to provide minimum interference with the installation of the mounting screws.

The standard pattern of mounting screw holes 32 in the back panel 30 of telephone housing 24 includes a pair of holes located one above and slightly outwardly spaced from the two top security studs 40 as illustrated in FIG. 2. In order to prevent the possibility of interference between the mounting screws 34 installed in these upper openings 32, a pair of enlarged openings 88 may be provided one in each of the top flanges 68, 70, to provide clearance for any portion of the mounting screws 34 which may project rearwardly past the back surface of inner plate 52. Since precise alignment of the mounting screw holes in panel 30 and wall 52 does not depend upon the keyhole openings 74 of the latching plate, precise tolerances are not required for the location of these openings. Accordingly, the openings 88 are preferably made substantially larger than the openings 32 to assure against any interference with the mounting screws. If desired, the openings 88 can be formed in the shape of vertically elongated slots to permit vertical sliding movement of the latch plate between its raised and lowered positions while mounting screws 34 are installed. It should be noted, also, that holes 88 may be eliminated by use of mounting screws which are so short as to not penetrate past the back surface of inner plate 52. Also, if desired, the screws 34 may be omitted from the two holes adjacent the upper security studs, relying upon the strength of the studs to provide the necessary mounting strength.

Various modifications may be made in the invention, including the specific configuration of the sliding latch plate and the means for mounting the latch plate for limited vertical sliding movement on the back surface of the internal wall 52. For example, integrally formed tabs could be substituted for the continuous lanced straps 80, 82. Also, such tabs could be initially formed to permit installation of the latch plate as a unitary structure, with the tabs then being deformed into position to overlie the back surface of the latch plate and retain it in position for its limited vertical sliding movement. Thus, while a preferred embodiment of the invention has been disclosed and described, I wish it understood that I do not intend to be restricted solely thereto, but rather that I do intend to include all embodiments thereof which would be apparent to one skilled in the art and which come within the spirit and scope of my invention.

I claim:

1. A vandal resistant mounting for a coin telephone having a generally rectangular housing including a substantially vertical back wall panel, the mounting comprising,
    a hollow upright support having spaced front and back walls and an internal mounting wall disposed between and in generally parallel spaced relation to the front and back walls,
    an opening in the front wall dimensioned to receive a coin telephone housing with the opening closely conforming to the periphery of the telephone housing,
    a plurality of threaded openings in the mounting wall and located in a predetermined pattern corresponding to a standard fastener hole pattern in a coin telephone housing back wall panel for receiving threaded screw fasteners extending through the openings in the telephone housing back wall panel, a plurality of security studs each having a shank portion and an enlarged head located on and projecting rearwardly from the telephone housing back wall panel, a plurality of stud receiving openings in the mounting wall, said stud receiving openings being located and dimensioned to permit the security studs on the rear panel to pass therethrough when the coin telephone is positioned in the opening in the front wall, a latch plate having a plurality of keyhole-shaped openings formed therein, the keyhole-shaped openings each including an enlarged lower portion dimensioned to permit said security stud heads to pass therethrough and a smaller upper portion dimensioned to closely engage said security stud shanks while preventing the passage of said stud heads therethrough, mounting means supporting said latch plate on the back surface of said mounting wall for limited sliding movement therealong, said mounting means being integrally formed with said mounting wall and projecting rearwardly therefrom and defining guide means engaging said latch plate and confining movement thereof to vertical sliding movement, said latch plate including stop means for engaging at least selected ones of said guide members for limiting the vertical sliding movement of the latch plate between a raised and a lowered position, and aligned openings in said telephone housing back panel and said mounting plate permitting access to said latch plate from within the telephone housing to permit manual movement of the latch plate between said raised and lowered positions, whereby, when said telephone housing is positioned within the opening in the front wall of the hollow upright support, said latch plate may be manually moved to the raised position at which the heads of said security studs can pass through the enlarged lower opening portions of said keyhole-shaped openings, after which the latch plate may be manually moved or permitted to move by gravity to the lowered position to engage said smaller upper portion of said keyhole-shaped openings with said stud shanks to releasably retain the coin telephone housing within the opening in the front wall with the threaded openings in the internal wall and the corresponding pattern of openings in the telephone housing rear wall panel being aligned for installation of screw fasteners to rigidly mount the telephone housing to the mounting plate and with said latch plate engaging said mounting studs reinforcing the screw fasteners to provide additional security against vandalism.

2. The invention as defined in claim 1 wherein said mounting means comprises a plurality of restraining members struck from the material of said mounting wall, said restraining members being deformed rearwardly from the plane of said mounting wall in position to overlie a portion of said latch plate.

3. The invention as defined in claim 2 wherein said latch plate has a top portion, an elongated central body portion, and a bottom portion, said central body portion having a width which is substantially less than the width of said top and bottom portions, said restraining members extending over and engaging said central body portion.

4. The invention as defined in claim 3 wherein said restraining members comprise at least one continuous strip lanced from said mounting wall, said strip being deformed rearwardly from and extending in substantially parallel relation to the back surface of said mounting wall.

5. The invention as defined in claim 2 wherein said latch plate has a total height no greater than about one half the height of said opening in said front wall, and wherein said latch plate is supported on said mounting wall with at least the major portion of the latch plate located above the horizontal centerline of said opening in said front plate.

6. The invention as defined in claim 5 wherein said restraining members comprise at least one continuous strip lanced from said mounting wall, said strip being deformed rearwardly from and extending substantially parallel to the back surface of said mounting wall.

7. The invention as defined in claim 6 wherein said latch plate is initially formed in a generally T-shaped segment and a generally rectangular segment, and wherein said T-shaped segment is initially mounted in said mounting wall by said restraining members and said rectangular segment is thereafter joined to said T-shaped segment by welding, said rectangular segment acting as a stop to positively prevent removal of said latch plate.

8. A method of mounting a coin telephone having a generally rectangular housing including a substantially vertical back wall on a hollow upright support post having spaced front and back walls and an internal mounting wall disposed between the front and back walls, an opening in the front wall dimensioned to receive the coin telephone housing with the opening closely conforming to the periphery of the telephone housing, and a plurality of threaded openings in the mounting wall and located to receive threaded screw fasteners extending through corresponding openings in the telephone housing back wall panel, the method comprising, providing a plurality of security studs on the telephone housing back wall panel, the studs each having a shank portion and an enlarged head projecting rearwardly from the back wall panel, providing a plurality of stud receiving openings in the mounting wall with the stud receiving openings being located and dimensioned to permit the head of the security studs to pass therethrough when the coin telephone is positioned in the opening in the front wall, forming latch plate mounting and guiding means integrally with the mounting wall with the mounting and guiding means projecting rearwardly from the mounting wall, utilizing the latch plate mounting and guiding means to mount a security stud latch plate on the back surface of the mounting wall for limited vertical sliding movement along the wall, the latch plate being provided with a plurality of keyhole-shaped openings for engaging and retaining the security studs, the keyhole-shaped openings each being formed to include an enlarged lower portion dimensioned to permit the security stud heads to pass therethrough and a smaller upper portion dimensioned to closely engage the security stud shanks while preventing the passage of the stud head therethrough, providing aligned openings in the telephone housing back wall panel and the mounting plate to permit access to the security stud latch plate from within the telephone housing, inserting the telephone housing in the opening of the front wall and manually moving and holding the latch plate to a raised position while passing the security stud heads through the keyhole-shaped openings and thereafter moving the latch plate to a lowered position to releasably secure the security studs and retain the telephone housing against removal, and installing a plurality of screw fasteners through the openings in the telephone housing rear wall panel to threadably engage the openings in the mounting wall to firmly mount the telephone housing on the mounting post.

9. The method as defined in claim 8 wherein the step of forming the latch plate mounting and guiding means on said mounting plate comprises forming a plurality of substantially horizontally extending cuts through the mounting wall, and deforming the material between adjacent pairs of cuts rearwardly from the plane of the mounting wall to form a plurality of straps which support and guide the security stud latch plate in its limited vertical sliding movement.

10. The method as defined in claim 9 wherein said straps are formed in the mounting wall at a position rearwardly of the top portion of the opening in the front wall of the support post.

* * * * *